United States Patent [19]

Ninomiya et al.

[11] 4,286,622
[45] Sep. 1, 1981

[54] CHECK VALVE ASSEMBLY

[76] Inventors: Youichi Ninomiya, 12-1 Yamashita-cho 3-chome; Kazuhiko Tsuno, 106, Kamaeguchi-cho 2-chome, both of Nobeoka-shi, Miyazaki-ken, Japan

[21] Appl. No.: 113,524

[22] Filed: Jan. 21, 1980

[51] Int. Cl.³ ............................................ F16K 15/04
[52] U.S. Cl. ......................... 137/533.11; 137/539; 137/516.29
[58] Field of Search ............. 137/515.5, 515.7, 516.27, 137/516.29, 533 N, 539–539.5, 516–525; 251/361

[56] References Cited

U.S. PATENT DOCUMENTS

| | | | |
|---|---|---|---|
| 720,100 | 2/1903 | Bashlin | 137/515.7 |
| 2,673,062 | 3/1954 | Cornelius | 251/361 X |
| 2,790,460 | 4/1957 | Radd | 137/515.7 |
| 3,346,008 | 10/1967 | Scaramucci | 137/515.7 X |

*Primary Examiner*—William R. Cline
*Attorney, Agent, or Firm*—Fleit & Jacobson

[57] ABSTRACT

The invention resides in a check ball valve assembly including a main valve body member taking the form of a rigid combination of a hollow cylindrical body element and a pipe coupling member at one end of the body element. The main valve body contains therein a movable ball valve member. In this valve assembly a further or second pipe coupling member is detachably connected at the opposite end of the body element. A resilient or elastomeric, double-functioning sealing member is positioned between the body element and the second pipe coupling and is so shaped and arranged to execute at its inside a detachable sealing function with the ball valve member and at the same time to execute at its outside a sealing function between the main valve body and the detachable pipe coupling member. The valve assembly further includes a retainer ring positioned stationarily behind the sealing member when seen in the regular fluid passage direction of the valve assembly. The retainer has a central tapered, fluid passage allowing bore, for engagement with the valve ball member for preventing an excess pressure contact of the latter with the sealing member. In the valve assembly, there are no O rings fitted therein.

6 Claims, 8 Drawing Figures

CHECK VALVE ASSEMBLY

BACKGROUND OF THE INVENTION

This invention relates to improvements in and relating to check valve assemblies of the type using a ball type valve member.

A considerable drawback met with this type of check valve is that access to inner parts thereof for troubleshooting and the like can be made only with difficulty in the practical service position of the valve assembly. At least a part of the piping in which the latter is fitted in service position must be cut off for easy dismantling of the valve assembly.

Therefore, the main object of the present invention is to avoid the above mentioned conventional drawback and to rather easily dismount the valve assembly from the service position in a pipe line.

An auxiliary object of the invention resides in that an intimate cooperation of the ball valve member with the related seal member is assured in such manner that permanent distortion of and/or mechanical biting in the latter can effectively be avoided.

These and further objects and advantages of the invention will be better understood in the detailed description of the invention set forth hereinafter with reference to the accompanying drawings.

SUMMARY OF THE INVENTION

For attaining these objects of the present invention, the valve body is comprised substantially of a main valve body member taking the form of a rigid combination of a hollow cylindrical body element with a pipe coupling member and movably containing therein a ball valve member. A further pipe coupling member is detachably connected at the opposite end of the main valve member. A resilient or elastomeric, double-functioning sealing member is positioned between the main valve member and the detachable pipe coupling member and is so shaped and arranged to execute at its inside a redetachable sealing function with the ball valve member and, at the same time, to execute at its outside a sealing function between the main valve body and the detachable pipe coupling member. In this way, almost none or only slight axial displacement stroke is necessary for the dismantling of the valve from the pipe line in which the present check valve assembly is fitted.

The novel sealing member taking naturally the form of a ring is attached at its inside surface with a valve member retainer. This retainer ring is made of a hard material, preferably hard plastic resin, for positioning the ball valve member in its closing service position for avoiding excess pressure contact with the sealing member, thus preventing any bite of the ball into the latter and assuring smooth detach of the ball from the sealing member upon closure of the latter.

DETAILED DESCRIPTION OF THE INVENTION

Before describing preferred embodiments of the invention in detail, a representative conventional check valve will be described with reference to FIG. 1 for the purpose of comparison with the present invention and for better understanding of the latter.

Figure 1:
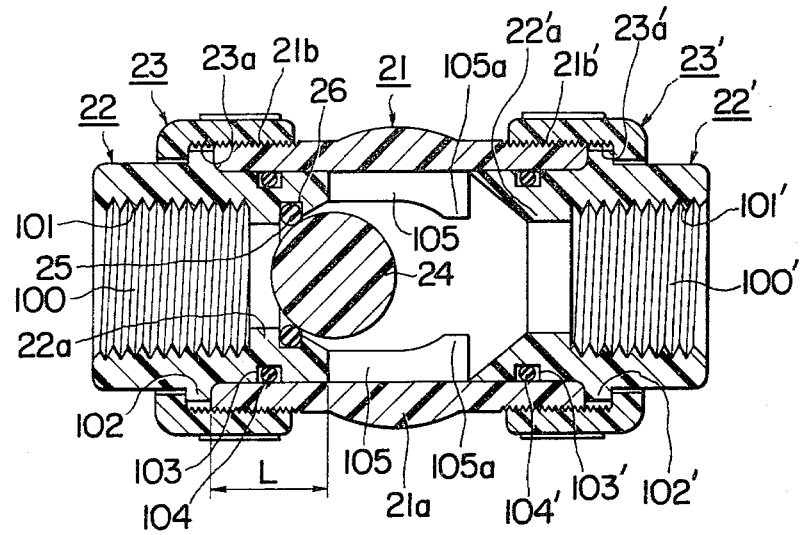
FIG. 1 is an axial section of a conventional and comparative check ball valve assembly.

In FIG. 1, numeral 21 represents a main valve body made substantially into a hollow cylinder made preferably of a hard synthetic resin material such as polyvinyl chloride, although the material is not always limited thereto. The cylindrical main valve body 21 is thickened in its wall thickness at 21a so as to show a gradually and centrally convex curved configuration for the reinforcing purpose. At the both ends of the valve body, there are provided male pipe threads 21b and 21b', respectively. Thus, these male threads represent each an outwardly tapering general configuration.

Numerals 22 and 22' represent end coupling members having respective fluid passage stepped bores 100 and 100', the substantial and larger parts thereof being formed with outwardly enlarging female pipe threads 101 and 101', respectively, so as to form detachable thread connections with threaded end pipes of a fluid piping system, not shown. These coupling members 22 and 22' are formed with respective outer shoulders 102 and 102' and outer ring grooves 103 and 103', O rings 104 and 104' being kept in these grooves for the sealing purpose relative to the main valve body 21. Inner portions 22a and 22'a of these members 22 and 22' act as tightly and slidably mating spigots defined inwardly in and by the ring shoulders 102 and 102' and kept in tight engagement with end parts of the straight-lined inside bore wall surface of the main valve body when the valve is assembled. This tight engagement is further assured by the O rings 104 and 104'. The coupling relationship between the valve body and the coupling members 22 and 22' is further assured by tightening a union nut 23 or 23' onto the male threads 21b or 21b' on the main valve body. For this purpose, the union nut 23 or 23' is formed with female pipe threads 23a or 23'a, respectively.

The coupling member 22 is formed with an inner ring groove 26 in close proximity to its radially outwardly tapered inside end abutting against the outer end of a plurality of parallel ball guides 105 made integral with the bore surface of the main valve body. An inner O ring 25 is positioned in the ring groove 26 for establishing the valve closing position shown, by the tight contact with a relatively large ball valve member 24 which is made preferably of a hard plastic resin material such as polyvinyl chloride as is the case with the coupling members 22 and 22'. Inward projections 105a formed on the lefthand ends of ball guides 105 serve for limiting the axial movable range of the valve ball.

The operation of this conventional kind of check ball valve is well known to those skilled in the art so that any further description would be unnecessary.

Much difficulty, however, will be met with such check ball valves, especially when a quick and rapid inside inspection is wanted, because the coupling member 22 must firstly be taken out from the bore of the main valve body with a relatively long stroke length L upon loosening the union nut 23. For this purpose, a part of the connected piping at least equal to such length L must be cut off. Or, the piping must have been fitted beforehand with a union pipe having a length at least equal to such length L.

Another difficulty resides in that when the fluid back pressure acting upon the ball valve member 24 from behind in the valve-closing direction is considerably high, the ball may fit too tightly into the inside sealing area of the O ring 25, which may occasionally be accompanied by the receding ball valve member when the latter acts to open the valve. In this case, a reclosing service of the check valve can not be executed since the O ring has been displaced from its service position shown. Even if not displaced from the regular service position, the O ring may be subject to damage upon repeated valve-closing operations under this excess pressurized condition.

For dismantling the check valve assembly from its service position, for replacement of the thus damaged O ring, access to the inner valve elements can only be made by unscrewing the union nut 23 and pulling out the coupling member 22 or 22' with a long stroke as was referred to above as L.

Next, referring to FIGS. 2-7, a preferred embodiment of the invention will be described in detail.

In this case, the main valve body 1 takes substantially a rigid combination of the hollow cylindrical main and central valve body 21 with a pipe coupling member 22' appearing in the foregoing.

Figure 2:
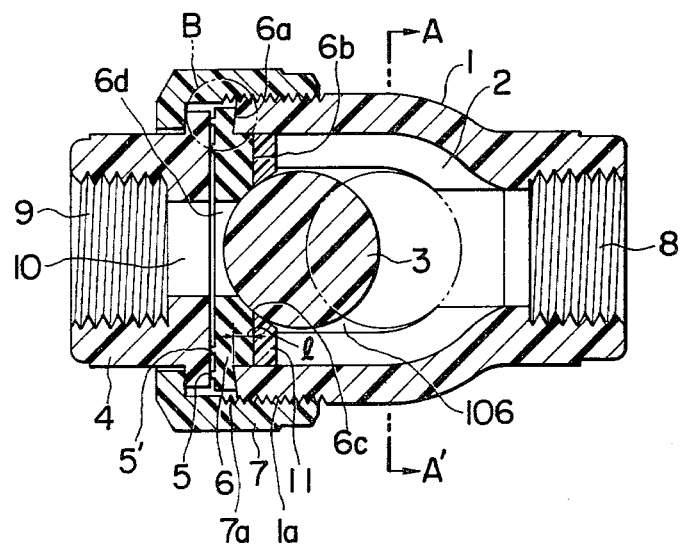
FIG. 2 is a similar view to FIG. 1, showing, however, a preferred embodiment of the invention.
Figure 3:
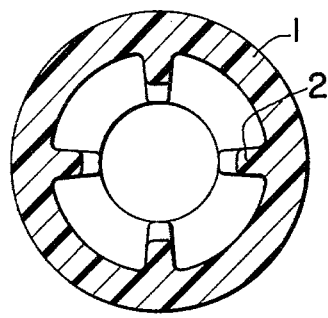
FIG. 3 is a cross-section taken along a section line A-A' shown in FIG. 2.

A plurality of valve ball guides 2 are formed integrally on the inside surface of the main valve body 1 in the similar manner as was referred to at 105 in the foregoing conventional embodiment of FIG. 1. In this way, the rigid ball valve member 3 is kept in its substantially axially movable way. In FIG. 2, the latter is shown in its fluid-closing position in full line and in its full open end position in chain-dotted line.

The valve body 1 is formed at its one end with pipe coupling threads 8 which are similar to those shown at 101' in the foregoing so as to serve for pipe connection. These pipe threads 8 define naturally a part of the fluid passage as at 100' in the foregoing. The fluid passage, although not specifically denoted, is adapted for establishing a direct fluid connection with the valve chamber 106 formed within the valve body 1, as is conventionally known.

At the opposite end and on the outer peripheral surface, the valve body is formed with male pipe threads 1a in the similar manner as at 21b in the foregoing, for reception of a union nut 7 which is similar to that shown at 23 in the foregoing. The female pipe threads are shown by the symbol 7a adapted for engagement with the corresponding male threads 1a.

The ball 3 is formed into as true a sphere as possible, having a diameter larger than the fluid passage bore 6d formed through the double-functioning sealing member 6, having a tapered inside corner ring surface 6c for sealing cooperation with the ball valve member when the valve is in the fluid passage interrupting position.

Valve retainer 11 made preferably of hard material, such as hard polyarcrylic polyvinyl chloride or the like, as an example, is inserted in position within the outer and larger end of the valve chamber 106, so as to be slightly inserted in position. The retainer ring 11 is formed with a concentrically tapered, axially outwardly reducing bore surface 11a for holding the ball valve member 3 in tightly closing position against the tapered corner surface 6c of the sealing member 6, thus preventing excessive pressurized contact of the ball with the latter and any biting into the elastomeric material of the sealing member 6. The latter has a slightly smaller outer diameter than that of the related end of valve body 1. The member 6 represents a stepped configuration as is specifically shown in FIGS. 4 and 7. The ring surface 6a is a radially outwardly rising tapered one, defining a slightly acute angle (FIG. 7) with a ring surface 6e extending in parallel with the central axis, not shown, of the member 6, so as to receive snugly the correspondingly shaped mating inside wall end of valve body 1. This slightly acute configuration of the latter avoids unintentional disengagement of the member 6 and ensures an increased thrust force-bearing performance and a better sealing effect upon the assembly of valve constituent members. The diameter of the shoulder surface 6e is selected to be substantially equal to that of the related end of the larger bore part of valve body 1. The bore diameter at 6d of the member 6 is substantially the same as that 10 of pipe coupling member 4.

At the opposite or outer end surface, the double-functioning sealing member 6 is formed with two mutually parallel sealing ridges 5 and 5' adapted for sealing cooperation with pipe coupling member 4. The number of these ridges may be reduced to only one, or increased to three or more, as the occasion may desire. Each of these ring edges may preferably have a semi-circular or the like cross-section, so as to execute the sealing job effectively. The provision of the tapered inside corner ring surface 6c serves naturally for establishing a tight, but detachable seal with the ball valve member 3 in the fluid-interrupting position of the valve assembly.

The pipe coupling member 4 is coupled with the valve body 1 through intermediary of the sealing member 6 and by thread-tightening of the union nut 7 on the male-threaded end of the valve body. Female-threaded portion 9 serves naturally for thread-connection of the end pipe element of a certain upstream side pipe line, not shown. Similar female-threaded connection 8 provided at the opposite end of valve body 1 serves equally for establishing thread connection with the end pipe element of a certain downstream side pipe line, not shown.

When the fluid is to pass through the valve assembly and in its regular flowing direction from upstream to downstream side, the fluid pressure will act upon the ball valve member 3, thereby the latter being shifted automatically from its full line position to its chain-dotted one in FIG. 2, for opening the valve. During such shift, the ball valve member is guided by a plurality of inwardly projecting stationary guides 2 and substantially along the central axis, not shown, of the valve assembly. Therefore, the fluid will be allowed to flow from the upstream side pipe line through the stepped bore 10 of pipe coupling, and the bores 6c and 11a of sealing member 6 and valve retainer 11, respectively, into the valve chamber 106 of valve body 1, thence through the stepped bore 8 into the downstream side pipe line.

On the contrary, when a higher fluid pressure acts in the reverse direction from the downstream side pipe line, the ball valve member will be turned from its valve-opening position back to its valve-closing position until the ball is brought into its fluid interrupting position for establishing a tight sealing contact with the tapered ring surface 6c of sealing member 6. This tapered configuration will serve for intensifying the fluid flow-interrupting, tight contact between the ball and seal member.

Related valve constituents 3; 6 and 11 are so designed and arranged that when the fluid back pressure is low, the ball 3 will contact with the smallest diameter portion or close thereto of the tapered contact area 6c on the sealing member, thus the contact pressure exerted thereupon by the ball member being nevertheless relatively high and the thus provided fluid flow-interrupting function being reliable. With increase of the fluid back pressure, the contacting area between the ball and seal member is increased and the latter is pressurized.

When the fluid back pressure attains a certain predetermined high level, valve ball 3 will abut on the tapered surface 11a of the retainer 11, thus preventing an excess pressure contact of the ball against the sealing member. In this way, otherwise possible disadvantageous permanent deformation of and/or any bite into the sealing member by the ball valve can effectively be prevented. Therefore, the durable life of the seal member will be extended to a considerable degree.

Although the inclined angle of the tapered surface 6c depends naturally upon the fluid back pressure, kind of material of sealing member 6 and diameter of ball valve member 3, it may preferably amount to 5–30 degrees relative to the tangent to the ball valve member drawn at the initial contacting point of the latter with the sealing member.

Since the outer flange surface 6a of the sealing member is squeezed under pressure between pipe coupling member 4 and valve body 1 when the valve assembly is in its service position, unintentional dropout of the member 6 during service of the valve assembly can be effectively prevented. Since the tapered configuration of the cooperating end of valve body 1 and the correspondingly mating surface 6a of the seating member, the latter can effectively be prevented from being fluidically sucked in, in the service position of the valve assembly, even if the fluid flow is very strong and effected especially with a high velocity.

Otherwise similar defect may be encountered with conventional check valves without use of the unique combination of the novel sealing member and the valve ball retainer, by occasionally met eccentric contact of the valve ball, thus exerting a lateral shift of the coacting stationary member.

By the provision of concentric sealing projections 5 and 5', the desired effective seal between the pipe coupling member 4 and valve body 1 can be assured.

On the other hand, the valve assembly pressure acting in the whole assembly as exerted by tightening the union nut 7, will act substantially at the outer flange portion at 6a in a substantially concentrated manner, so far as the sealing member is concerned, a light tightening in the above sense will suffice to prevent fluid leaks at the jointed connections of the valve constituents.

The tapered contact at 6a between valve body 1 and sealing member 6, provides a quicker and easy centering of the latter that can be realized during assembly of the valve constituents of the valve assembly.

When access is wanted to inner parts of the valve assembly, the union nut 7 is first loosened.

In this way, the body 1 can easily be separated from pipe coupling member 4. Then, sealing member 6, ball retainer ring 11 and valve ball member 3 can be taken out from the valve body for inspection and/or parts exchange.

Since the novel sealing member may execute the double sealing function, with the valve ball 3 on the one hand, and with the pipe coupling member 4 on the other, use of delicate and unreliable O ring(s) may be dispensed with.

Therefore, the whole valve structure is simple and reliable, nd the assembly and dismantling job can be effectively executed in a rather convenient and quicker manner.

Figure 8:
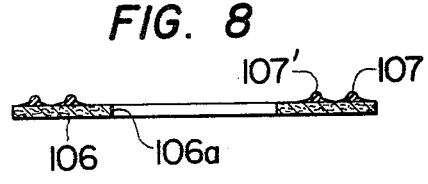
FIG. 8 is a cross-sectional view of an auxiliary sealing member which can be occasionally used in cooperation with a modified main sealing ring member.
Figure 6:
FIG. 6 is a cross-section of a retainer ring shown also in FIG. 2, being adapted for control against excess pressure contact of the ball valve member against the sealing member.

In FIG. 8, a bored sealing disc 106 is shown, as a modification of a part of the foregoing embodiment.

The disc 106 is a sheet which is made of somewhat hard, but pliable material, such as asbestos fiber, hard paper or the like fibrous material, having a fluid passage bore 106a in the similar manner as was shown at 6d in FIG. 2.

Figure 4:
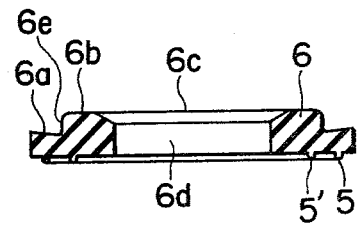
FIG. 4 is a somewhat enlarged cross-section of a double-functioning sealing member to be inserted between the pipe coupling member and the valve body of the valve assembly according to the invention for providing effective seal therebetween and at the same time adapted for sealing cooperation with the ball valve member.
Figure 7:
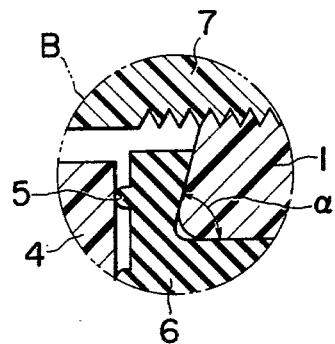
FIG. 7 is a partial enlarged view of several related valve constituents as encircled by a small chain-dotted circle B shown in FIG. 2.
Figure 5:
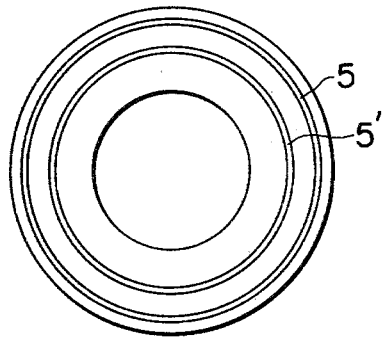
FIG. 5 is a front view of the sealing member shown in FIG. 4.

On one surface of this disc 106, there are provided two parallel ring ridges 107 and 107' in the similar manner as was shown at 5 and 5', respectively, in FIGS. 4, 5 and 7. These ridges 107 and 107' may be made of a hard and corrosion-resistant resin, such as "Teflon". The same resin can be used as the covering of the foregoing ring ridges 5 and 5', although not shown.

When this ring seat 106 is used in an overlapped combination with the seal member 6, the ring ridges 5 and 5' may be cut off. Therefore, as the sealing member or sealing ring member as denoted in the foregoing means the ring member 6 per se or a combination of the ring sheet 106 with the seal member 6 having no ring ridges 5 and 5' cut out in this case only.

The embodiments of the invention in which an exclusive property or privilege is claimed are as follows:

1. A check ball valve assembly comprising:
   a main valve body member comprising a hollow cylindrical body element defining a fluid flow path and a first pipe coupling member positioned at a first end of the fluid flow path and integral with the body element;
   a ball valve member positioned in said hollow cylindrical body for movement between a blocking position blocking said fluid flow path and an unblocking position spaced from the blocking position, the blocking position being at a second end of the fluid flow path;
   a second pipe coupling member detachably connected to said main valve body member at the second end of the fluid flow path;
   a resilient sealing member positioned between said second pipe coupling member and said main valve body member, said sealing member having an inner surface contacted by said ball valve member in said blocking position to thereby seal the fluid flow path and having portions thereof forming a seal between said valve body member and said second pipe coupling member; and
   a retainer ring fixedly positioned between said sealing member and said ball valve member, said retainer ring being formed of a material harder than that forming the sealing member and having a central tapered fluid passage allowing bore engageable by said ball valve member in said blocking position to thereby limit movement of said ball valve member and prevent excess pressure contact between said ball valve member and said sealing member.

2. The check ball valve of claim 1, wherein said sealing member is formed with a stepped surface for sealing engagement with said main valve body member, the stepped surface having an acute stepping angle.

3. The check ball valve of claim 1 or 2, wherein said sealing member is formed with a surface having concentric protruding portions for sealing engagement with said second pipe coupling member.

4. The check ball valve of claim 3, wherein said retainer ring is formed of hard material, such as hard polyacrylic polyvinyl chloride.

5. The check ball valve of claim 3, wherein said main valve body and said second pipe coupling member have confronting end surfaces spaced from each other in the direction of the fluid passage, and wherein said sealing member is interposed between said confronting end surfaces.

6. The check ball valve of claim 3, wherein said sealing member and said retainer ring have confronting surfaces which are in contact with each other only along a plane extending perpendicular to the fluid flow path.

* * * * *